United States Patent
Okuhara et al.

(10) Patent No.: US 9,673,600 B2
(45) Date of Patent: Jun. 6, 2017

(54) GROMMET

(71) Applicant: Sumitomo Wiring Systems, Ltd., Yokkaichi, Mie (JP)

(72) Inventors: Takashi Okuhara, Mie (JP); Tsutomu Sakata, Mie (JP); Gousei Kobayashi, Mie (JP); Akira Iijima, Mie (JP); Ryota Mori, Mie (JP); Yukari Hoshino, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 0 days.

(21) Appl. No.: 14/788,900

(22) Filed: Jul. 1, 2015

(65) Prior Publication Data

US 2016/0005516 A1   Jan. 7, 2016

(30) Foreign Application Priority Data

Jul. 3, 2014   (JP) ................................. 2014-137527

(51) Int. Cl.
*H02G 3/22* (2006.01)
*B60R 16/02* (2006.01)

(52) U.S. Cl.
CPC ........... *H02G 3/22* (2013.01); *B60R 16/0222* (2013.01)

(58) Field of Classification Search
CPC ..................................................... H02G 3/22
USPC ....................................................... 174/650
See application file for complete search history.

(56) References Cited

U.S. PATENT DOCUMENTS

| 5,536,183 | A * | 7/1996 | Brandolf | H01R 4/72 439/470 |
| 2001/0020536 | A1* | 9/2001 | Kondoh | B60R 16/0222 174/650 |
| 2002/0038715 | A1* | 4/2002 | Nakata | B60R 16/0222 174/650 |
| 2004/0140118 | A1* | 7/2004 | Nishimoto | B60R 16/0222 174/650 |
| 2006/0243748 | A1* | 11/2006 | Rampini | B05B 11/3025 222/321.2 |
| 2011/0067201 | A1* | 3/2011 | Okuhara | B60R 16/0222 16/2.1 |

FOREIGN PATENT DOCUMENTS

JP   2013-38978   2/2013

* cited by examiner

*Primary Examiner* — Hoa C Nguyen
*Assistant Examiner* — Stanley Tso
(74) *Attorney, Agent, or Firm* — Gerald E. Hespos; Michael J. Porco; Matthew T. Hespos

(57) ABSTRACT

A grommet (10) is mounted on a burred part (54) formed on an inner periphery of a through hole (52) formed on a panel (50). The grommet (10) includes a small-diameter tubular portion (12), a large-diameter tubular portion (20) and a coupling (16) connecting the small-diameter tubular portion (12) and the large-diameter tubular portion (20). The small-diameter tubular portion (12) is held in close contact with an outer peripheral surface of the wire (60), and the a large-diameter tubular portion (20) is fit on an outer peripheral side of the burred part (54) of the panel (50). A rib (40) projects from an inner peripheral surface of the coupling (16) and covers at least a part of an inner peripheral surface side of the burred part (54) of the panel (50).

6 Claims, 3 Drawing Sheets

GROMMET

BACKGROUND

1. Field of the Invention

This invention relates to a grommet to be mounted into a through hole formed on a panel.

2. Description of the Related Art

A grommet is mounted externally around a wire that passed through a hole formed in a panel to protect the wire and to prevent the entrance of water and the like through the through hole. Japanese Unexamined Patent Publication No. 2013-38978 discloses a grommet to be mounted on a burred part formed at an inner periphery of the through hole. The grommet described in Japanese Unexamined Patent Publication No. 2013-38978 has a pressing portion provided on a fixing member that is locked to a base end part of a burred portion and a seal located outside the burred portion is tightened by a fastening member in a state where the burred portion is located between the fixing member and the sealing member.

Some grommets have no inner fixing member. In this case, the seal may be displaced relative to the burred portion before being tightened by the fastening member and, further, the seal may be detached from the burred portion.

Accordingly, an object of the invention is to suppress a displacement of a grommet relative to a burred portion before tightening by a fastening member.

SUMMARY OF THE INVENTION

The invention relates to a grommet to be mounted on a burred part formed on an inner periphery of a through hole formed on a panel and includes a small-diameter tubular portion through which a wire is insertable. The small-diameter tubular portion has an inner peripheral surface held in close contact with an outer peripheral surface of the wire. The grommet further has a large-diameter tubular portion to be fit on an outer peripheral side of the burred part of the panel. A coupling connects the small-diameter tubular portion and the large-diameter tubular portion. A rib projects from an inner peripheral surface of the coupling and is configured to cover at least a part of an inner peripheral surface side of the burred part of the panel. Thus, the rib suppresses a displacement of the grommet relative to the burred part after the grommet is mounted on the burred part and in a temporary locked state before a fixing member is mounted on an outer peripheral side of the large-diameter tubular portion The grommet may further include a projection projecting from an outward facing surface of the rib to be held in contact with the burred part of the panel. The projection makes the grommet less likely to be displaced relative to the burred part The rib may formed around in a circumferential direction. Thus, air is sealed in a space enclosed by the burred part, the large-diameter tubular portion, the coupling and the rib. This causes the sealed space to expand and an air pressure inside to be reduced if an attempt is made to pull out the grommet from the burred part so that a pressure acts in a direction opposite to a pulling direction. Thus, it becomes difficult to pull out the grommet.

DETAILED DESCRIPTION OF THE PREFERRED EMBODIMENTS

Figure 1:
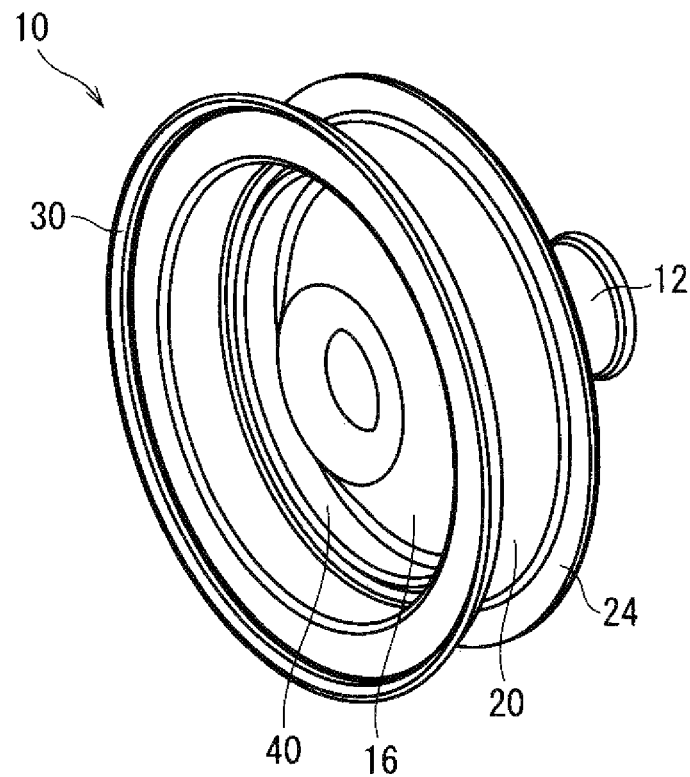
FIG. 1 is a perspective view showing a grommet according to one embodiment.
Figure 2:
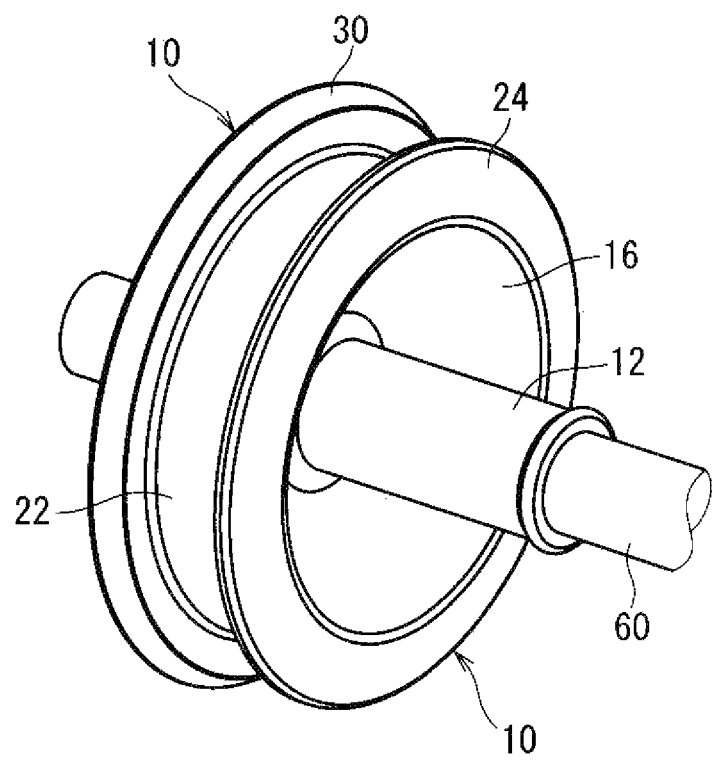
FIG. 2 is a perspective view showing the grommet mounted on a wire.
Figure 3:
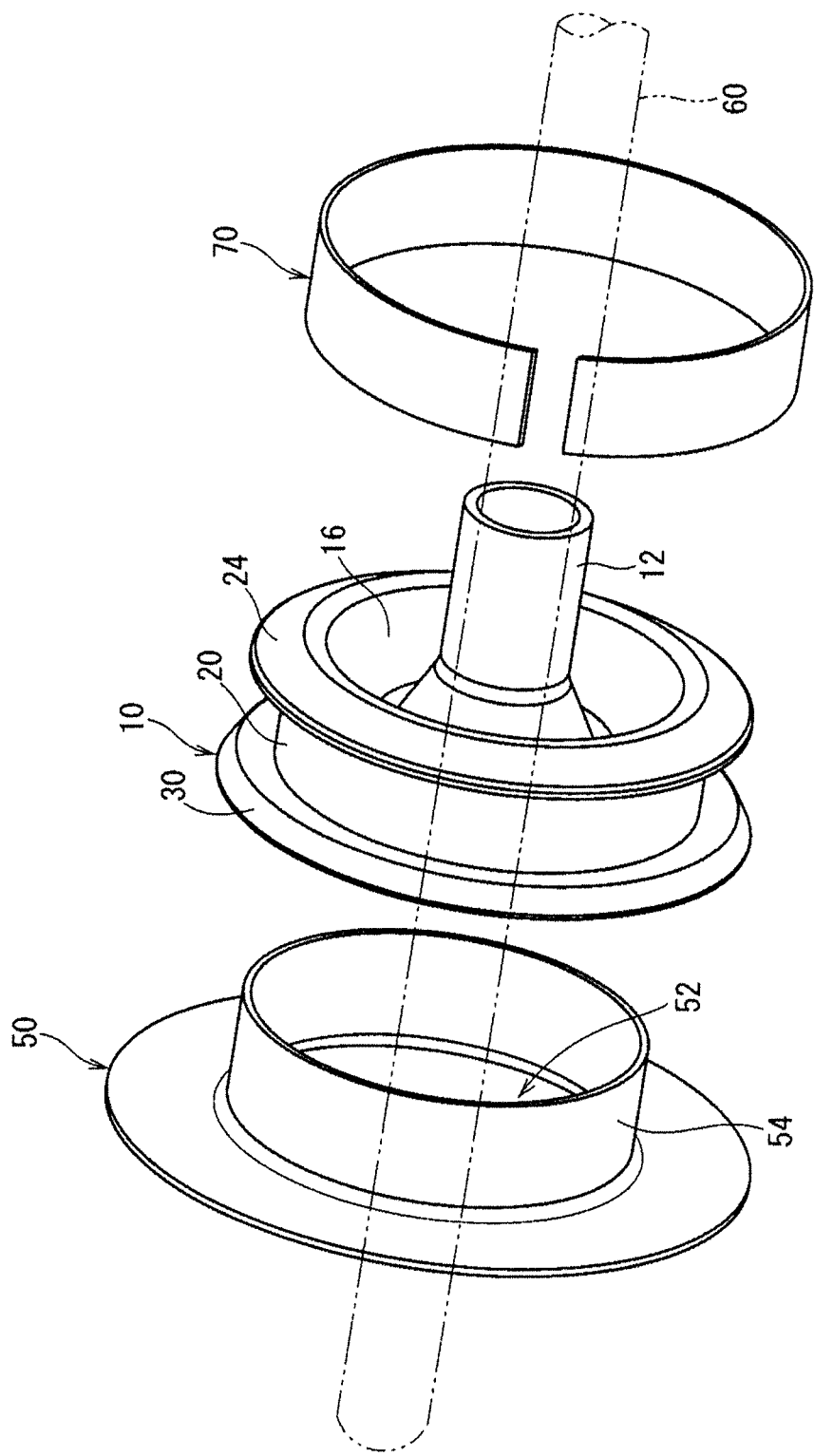
FIG. 3 is an exploded perspective view showing a mounting structure for the grommet according to the one embodiment.
Figure 4:
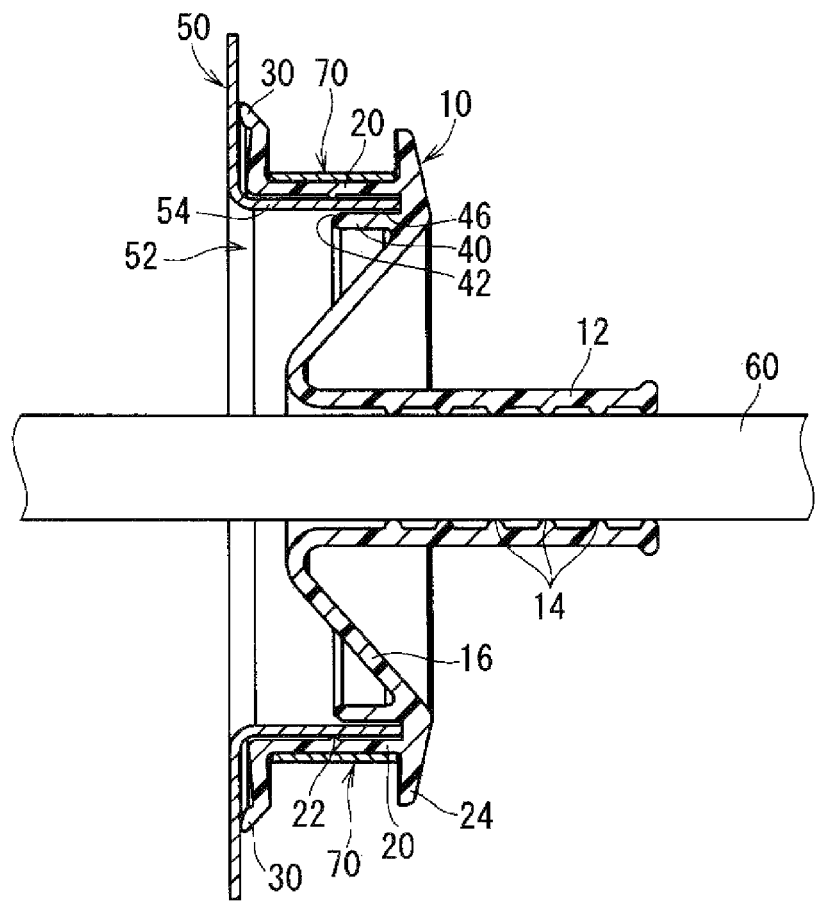
FIG. 4 is a section showing a mounting structure for the grommet.

FIG. 1 is a perspective view showing a grommet 10 according to one embodiment. FIG. 2 is a perspective view showing the grommet 10 mounted on a wire 60. Note that FIG. 1 is a perspective view viewed from the side of a large-diameter tubular portion 20 and FIG. 2 is a perspective view viewed from the side of a small-diameter tubular portion 12. FIGS. 3 and 4 are respectively an exploded perspective view and a section showing a mounting structure for mounting the grommet 10 according to the one embodiment on a panel 50 of a vehicle body or the like.

The grommet 10 according to the embodiment is mounted on a burred part 54 formed on an inner peripheral edge part of a through hole 52 for wire insertion formed on the panel 50 of the vehicle body. The grommet 10 is mounted such as for the purpose of preventing the entrance of water and the like through the through hole 52 and protecting the wire 60.

Here, the through hole 52 and the wire 60 are described first for convenience of description.

The through hole 52 as a target is formed on the panel 50 such as a metal panel in a vehicle body of an automotive vehicle. Here, the through hole 52 is a hole portion including the burred part 54 (tubular standing wall portion) formed by causing an opening edge part of a hole to stand by burring after the hole is formed on the panel 50. More specifically, the burred part 54 is formed into a tubular shape projecting toward one side of the panel 50 along a direction substantially perpendicular to the panel. Of course, the through hole 52 may be formed by welding a tubular standing wall portion to an opening edge part of a hole formed on the panel 50. Further, it is assumed that the through hole 52 is formed into a substantially circular shape here. Specifically, the burred part 54 is formed into a substantially hollow cylindrical shape.

The wire 60 is inserted through this through hole 52. A clearance between the through hole 52 and the wire 60 is closed by the grommet 10 to stop water between a space on a tip side of the burred part 54 and a space on a base end side of the burred part 54 with the panel 50 interposed between the spaces.

The wire 60 has only to include at least one wire. An intermediate part of the wire 60 is fixed to the small-diameter tubular portion 12 of the grommet 10. The wire 60 is so configured that an insulation coating is formed by extruding and coating resin on the outer periphery of a core. Here, an example in which a plurality of wires 60 are bundled into a wire bundle is described. Note that an optical fiber or the like may be arranged along the wires 60 in the wire bundle. The wires 60 are used to electrically connect various electrical devices mounted in the vehicle or the like in a state arranged at an arrangement target position of the vehicle or the like. Note that an outline of the wire bundle is shown in FIGS. 2 to 4.

The grommet 10 is a member formed of a relatively easily resiliently deformable material such as rubber or elastomer so as to be held in close contact with a target. The grommet 10 includes the small-diameter tubular portion 12, the large-diameter tubular portion 20, a coupling 16 and a rib 40. Here, the grommet 10 is integrally molded. The small-diameter tubular portion 12, the coupling 16 and the large-diameter tubular portion 20 are successively connected from one end part toward the other end part of the grommet 10. The rib 40 projects on the coupling 16.

The small-diameter tubular portion 12 is formed into a tubular shape through which the wire 60 is insertable. The inner peripheral surface of the small-diameter tubular portion 12 is fixed to the wire 60 while being partly held in close contact with the outer peripheral surface of the wire 60. Specifically, an inner diameter of the small-diameter tubular portion 12 is set equal to or smaller (here, slightly smaller) than an outer diameter of the wire 60 (wire bundle) to be inserted. To fix the small-diameter tubular portion 12 and the wire 60, the wire 60 is inserted from one end part toward the other end part of the small-diameter tubular portion 12 with the small-diameter tubular portion 12 expanded in diameter. Then, the small-diameter tubular portion 12 is released from the state expanded in diameter and tape or the like is wound around the outer peripheral surface of the small-diameter tubular portion 12 and the outer peripheral surface of the wire 60 extending outward from an end part of the small-diameter tubular portion 12.

Here, a plurality of (here, five) first annular protrusions 14 are formed in the small-diameter tubular portion 12. More specifically, the first annular protrusions 14 are formed to project from the inner peripheral surface of the small-diameter tubular portion 12. The first annular protrusions 14 are formed around the inner peripheral surface of the small-diameter tubular portion 12 in a circumferential direction. The first annular protrusions 14 are held in close contact with the wire 60 while being resiliently deformed to be compressed, whereby the entrance of water and the like through the interior of the small-diameter tubular portion 12 can be suppressed.

Of course, it is not essential to form the first annular protrusions 14 and the first annular protrusions 14 may not be formed. If the small-diameter tubular portion 12 is formed with the first annular protrusions 14, an inner diameter of at least a part of the small-diameter tubular portion 12 where the first annular protrusions 14 are formed may be set smaller than the outer diameter of the wire 60 (bundle of the wires 60) to be inserted.

Here, an end part of the small-diameter tubular portion 12 on the side of the panel 50 (end part connected to the coupling 16) is located between opposite lateral end parts of the large-diameter tubular portion 20 along a longitudinal direction of the wire 60. This causes a part connecting the small-diameter tubular portion 12 and the coupling 16 to be located inside the burred part 54, whereby a degree of freedom in a direction of a part of the wire 60 extending outward from the tip of the burred part 54 out of the through hole 52 can be increased.

Of course, it is not essential that the end part of the small-diameter tubular portion 12 on the side of the panel 50 is located between the opposite lateral end parts of the large-diameter tubular portion 20 along the longitudinal direction of the wire 60 and the position of the end part of the small-diameter tubular portion 12 on the side of the panel 50 may be appropriately set. For example, the end part of the small-diameter tubular portion 12 on the side of the panel 50 is thought to be located outwardly of an end part of the large-diameter tubular portion 20 along the longitudinal direction of the wire 60.

The coupling 16 is a part connecting the small-diameter tubular portion 12 and the large-diameter tubular portion 20. Here, since the end part of the small-diameter tubular portion 12 is located between the opposite lateral end parts of the large-diameter tubular portion 20 along the longitudinal direction of the wire 60 as described above, the coupling portion 16 is formed to be gradually enlarged in diameter from one end side toward the other end side of the small-diameter tubular portion 12. That is, the coupling 16 is formed to connect from the inside of the large-diameter tubular portion 20 to the end part of the large-diameter tubular portion 20.

Here, a locking portion 24 is further connected to an end part of the coupling portion 16 connected to the large-diameter tubular portion 20. The locking portion 24 is formed to project further radially outwardly of the large-diameter tubular portion 20 from the end part of the coupling portion 16. The locking portion 24 is a part for suppressing a displacement of a fastening member 70 to be described later relative to the large-diameter tubular portion 20 and the detachment of the fastening member 70 from the large-diameter tubular portion 20 thereby when and after the fastening member 70 is mounted on the large-diameter tubular portion 20.

The large-diameter tubular portion 20 has the inner peripheral surface thereof formed into a tubular shape in conformity with the outer peripheral surface of the burred part 54 so as to be fitted on an outer peripheral side of the burred part 54 of the panel 50. Here, since the burred part 54 is formed into a hollow cylindrical shape, the large-diameter tubular portion 20 is also formed into a hollow cylindrical shape. The fastening member 70 is fastened onto the outer peripheral surface of the large-diameter tubular portion 20 with the large-diameter tubular portion 20 fitted on the burred part 54, whereby the large-diameter tubular portion 20 is fixed into close contact with the burred part 54 to fix the grommet 10 to the panel 50 and suppress the entrance of water and the like through a clearance between the panel 50 and the grommet 10.

Note that, in this specification, a state where the grommet 10 is fit on the burred part 54 of the panel 50 and the fastening member 70 is not mounted on the outer peripheral surface of the large-diameter tubular portion 20 is called a temporary locked state and an operation of merely fitting the grommet 10 on the burred part 54 is called a temporary locking operation.

An axial dimension of the large-diameter tubular portion 20 may be appropriately set. Here, this dimension is so set that the tip of the burred part 54 can be held in close contact with the coupling portion 16 in a state where an outer edge sealing portion 30 to be described later is held in contact with a peripheral edge part of the through hole 52. Although described in detail later, this makes a displacement of the grommet 10 less likely in the temporary locked state.

Here, a second annular protrusion 22 is formed in the large-diameter tubular portion 20. More specifically, the second annular protrusion 22 projects from the inner peripheral surface of a part of the large-diameter tubular portion 20, around which the fastening member 70 is to be mounted. The second annular protrusion 22 is formed around the inner peripheral surface of the large-diameter tubular portion 20 in the circumferential direction. By setting an inner diameter of the second annular protrusion 22 equal to or smaller than an outer diameter of the burred part 54, the second annular protrusion 22 is deformed resiliently to be compressed and held in close contact with the burred part 54 in a state where the fastening member 70 is fastened onto the outer periphery of the large-diameter tubular portion 20. Thus, water and the like cannot enter through a clearance between the burred part 54 and the large-diameter tubular portion 20.

Of course, it is not essential to form the second annular protrusion 22 in the large-diameter tubular portion 20 and the second annular protrusion 22 may not be formed. In this case, an inner diameter of the large-diameter tubular portion 20 may be set substantially equal to (here, slightly smaller than) the outer diameter of the burred part 54. By setting the inner diameter of the large-diameter tubular portion 20 equal to or smaller than the outer diameter of the burred part 54, the large-diameter tubular portion 20 can be held in close contact with the burred part 54.

Here, the outer edge sealing portion 30 is connected to an end part of the large-diameter tubular portion 20 on a side opposite to the one connected to the coupling portion 16. The outer edge sealing portion 30 is formed to project further radially outwardly of the large-diameter tubular portion 20 and be held in contact with the peripheral edge part of the through hole 52 out of the panel 50.

More specifically, the tip of the outer edge sealing portion 30 projects toward the panel 50 and is resiliently deformed and held in close contact with the panel 50 to press the panel 50 with the grommet 10 mounted on the panel 50, thereby suppressing the entrance of water and the like through a clearance between the outer edge sealing portion 30 and the panel 50.

Here, if the inner diameter of the second annular protrusion 22 or the large-diameter tubular portion 20 is set equal to or smaller than the outer diameter of the burred part 54, the entire peripheral surface of the large-diameter tubular portion 20 is in contact with the outer peripheral surface of the burred part 54 even in the temporary locked state. This causes a frictional force produced when a force is applied in a direction to pull out the grommet 10 to increase and makes the grommet 10 difficult to displace. However, even in this case, adhesion among the large-diameter tubular portion 20, the grommet 10 and the burred part 54 is weakened and the grommet 10 may be possibly displaced and pulled out if a force is also applied in a radial direction of the grommet 10. Further, if the force applied in the direction to pull out the grommet 10 increases and cannot be resisted with the frictional force, the grommet 10 may be also possibly displaced and pulled out. The grommet 10 is provided with the rib 40 to be able to suppress at least one of these cases.

The rib 40 is formed to project from the inner peripheral surface of the coupling portion 16. Here, the inner peripheral surface of the coupling portion 16 means a surface connected to the inner peripheral surface of the large-diameter tubular portion 20. Further, the rib 40 is formed to cover at least a part of an inner peripheral surface side of the burred part 54 of the panel 50. By providing such a rib 40, the grommet 10 is formed with a recess 46 capable of accommodating the tip of the burred part 54 in a part surrounded by the large-diameter tubular portion 20, the coupling portion 16 and the rib 40.

Specifically, the rib 40 is formed to project from the inner peripheral surface at a position spaced apart from a part of the coupling portion 16 connected to the large-diameter tubular portion 20 by a thickness of the burred part 54 of the panel 50 or larger (here, slightly larger) in a radial direction. At this time, the rib 40 is formed to project in a direction parallel to an axial direction of the large-diameter tubular portion 20, i.e. an axial direction of the burred part 54 of the panel 50 here. Of course, the rib 40 may be formed to obliquely extend from a part located inwardly of the inner peripheral surface of the burred part 54 toward the burred part 54.

Here, the outer peripheral surface of the rib 40 is formed at a very short distance from the inner peripheral surface of the burred part 54. Even in this case, the rib 40 may be so formed as to partly come into contact with the burred part 54 when the small-diameter tubular portion 12 is pulled. Of course, the outer peripheral surface of the rib 40 may be formed to be in contact with the inner peripheral surface of the burred part 54 even in a state where no force is applied. Here, in this specification, the rib 40 is assumed to cover the burred part 54 when the rib 40 is in contact with the burred part 54 as just described and when a spacing between them is very small even if they are not in contact.

Note that if the rib 40 is in contact with the burred part 54, a frictional force acts to make a displacement of the grommet 10 less likely when a force is applied to pull out the grommet 10. However, since being formed at a very short distance from the burred part 54 here, the rib 40 is not in contact with the burred part 54. Even in such a case, a displacement of the grommet 10 is made less unlikely when a force is applied to pull out the grommet 10. This principle is described in detail below.

Specifically, if a force is applied in a direction to pull out the grommet 10, this force is often applied to the small-diameter tubular portion 12. That is, the grommet 10 is pulled out by pulling the small-diameter tubular portion 12. Because of this and the grommet 10 formed of a relatively easily resiliently deformable material, if the small-diameter tubular portion 12 is pulled, a force is mainly applied to a part of the grommet 10 connecting the coupling portion 16 and the large-diameter tubular portion 20 and this part is deformed even when the rib 40 is formed at a very short distance from the burred part 54. Associated with this deformation, at least a part of the rib 40 (e.g. base end side part of the rib 40) projects toward the burred part 54 and comes into contact with the burred part 54.

Particularly, since one end of the short-diameter tubular portion 12 is located inside the large-diameter tubular portion 20 here, the one end of the large-diameter tubular portion 12 is deformed to protrude outwardly of the large-diameter tubular portion 20 if the short-diameter tubular portion 12 is pulled to pull out the grommet 10. Associated with this deformation, at least a part of the rib 40 along the longitudinal direction comes into contact with the burred part 54.

Further, if a force is applied also in a radial direction of the grommet 10 when a force is applied in the direction to pull out the grommet 10, the rib 40 comes into contact with the inner peripheral surface of the burred part 54 instead of the large-diameter tubular portion 20. In this way, even if the rib 40 is formed not to be in contact with the burred part 54, a displacement of the grommet 10 can be suppressed if the force is applied also in the radial direction of the grommet 10 when the force is applied in the direction to pull out the grommet 10.

Here, the rib 40 is formed around in the circumferential direction without interruption. In other words, the rib 40 is formed into a hollow cylindrical shape having an outer diameter equal to or smaller (here, slightly smaller) than an inner diameter of the burred part 54. Thus, the recess 46 surrounded by the large-diameter tubular portion 20, the coupling portion 16 and the rib 40 is formed into an annular groove here.

Of course, it is not essential to form the rib around in the circumferential direction without interruption. For example, it is conceivable that an opening is present in a circumferential part of the rib 40. Further, it is, for example, conceivable that the rib 40 is divided into a plurality of sections in the circumferential direction, i.e. a plurality of small ribs 40 are scattered in the circumferential direction.

However, airtightness is enhanced by forming the rib 40 around in the circumferential direction without interruption. Since this causes a sealed space to be volumetrically expanded when a force is applied to pull out the grommet 10, an air pressure in the sealed space is reduced and a displacement of the grommet 10 is less likely to occur in the temporary locked state.

Specifically, the recess 46 is formed into an annular groove here as described above and at least a part of the annular groove is closed by the burred part 54 by fitting the burred part 54 into this annular groove. This causes the part of the annular groove closed by the burred part 54 to become a closed space and air is sealed. When the grommet 10 is pulled out, the volume of this closed space increases to reduce an air pressure in the closed space, creating an air pressure difference between the closed space and outside. In this way, a force resisting the force for pulling out the grommet 10 becomes larger, making a displacement of the grommet 10 less likely.

More specifically, the second annular protrusion 22 is held in close contact with the burred part 54 and the tip of the burred part 54 is held in close contact with the coupling portion 16 here as described above. This causes a space enclosed by the second annular protrusion 22, the burred part 54, the coupling portion 16 and the large-diameter tubular portion 20 to become a closed space and air is sealed in this space. Here, if the grommet 10 is slightly pulled when the rib 40 is not provided, a clearance is formed between the tip of the burred part 54 and the coupling portion 16 and this closed space disappears. However, the rib 40 is provided around in the circumferential direction and comes into contact with the burred part 54, whereby the rib 40 can maintain the closed space instead of the coupling portion 16 even if the grommet 10 is slightly pulled. At this time, the volume of the closed space is increased by the clearance between the tip of the burred part 54 and the coupling portion 16. Thus, by the volumetric expansion of this closed space when the grommet 10 is pulled out, the air pressure inside is reduced and approaches a vacuum state, wherefore a force resisting the pull-out force becomes larger. In this way, a displacement of the grommet 10 is made less likely to occur.

Further, since the rib 40 is formed around in the circumferential direction without interruption, the rigidity of the rib 40 increases and the rib 40 is difficult to deform even if an external force is applied to the rib 40 when a force is applied in the direction to pull out the grommet 10.

Here, a tapered portion 42 is formed on the outer peripheral surface (surface facing the inner peripheral surface of the burred part 54) of a tip part of the rib 40. The tapered portion 42 is formed to widen an opening of the recess 46. This makes it less likely for the tip of the burred part 54 to be caught by the rib 40 when the large-diameter tubular portion 20 is fitted on the burred part 54, whereby the burred part 54 is more easily located between the outer peripheral surface of the rib 40 and the inner peripheral surface of the large-diameter tubular portion 20.

Note that a projecting distance of the rib 40 may be appropriately set, but the rib 40 is preferably formed to project at a position facing the second annular protrusion 22 provided in the large-diameter tubular portion 20 or before that position so that the tip thereof is not located beyond the position facing the second annular protrusion 22 when the second annular protrusion 22 is provided in the large-diameter tubular portion 20. In this way, when the grommet 10 is fabricated using a mold or the like, a part of the large-diameter tubular portion 20 including the second annular protrusion 22 can be easily released from the mold and the moldability of the grommet 10 can be improved.

The fastening member 70 is mounted around the large-diameter tubular portion 20. Here, a ring-shaped member made of resiliently deformable metal is used as the fastening member 70. Specifically, the ring-shaped member made of metal is formed to have an inner diameter larger than that of the large-diameter tubular portion 20, more specifically substantially equal to that of the locking portion 24 to be described later and an opening is formed in a circumferential part. The ring-shaped member is resiliently deformably formed to be contracted until having a diameter smaller than the outer diameter of the large-diameter tubular portion 20.

Further, a dimension of the ring-shaped member made of metal along the longitudinal direction of the wire 60 is set substantially equal to a dimension of the large-diameter tubular portion 20 (here, dimension substantially equal to a spacing between the annular sealing portion and the locking portion 24) and the ring-shaped member tightens the large-diameter tubular portion 20 over the entirety of the large-diameter tubular portion 20.

Of course, the fastening member 70 is not limited to the one described above. It is also conceivable to use, for example, a tying band, a hose band or the like as the fastening member.

Here, the typing band is a member including a band portion in the form of a long strip provided with a plurality of locked portions in a longitudinal direction and a circumferential length maintaining portion which is coupled to a base end part of the band portion, through which a tip part of the band portion can be inserted and which includes a locking portion selectively lockable to the plurality of locked portions of the inserted band portion.

Further, the hose band is a member including a metal band portion in the form of a long strip provided with a plurality of elongated projections perpendicular to a longitudinal direction and arranged at equal intervals in the longitudinal direction and a circumferential length maintaining portion which is coupled to a base end part of the metal band portion, through which a tip part of the metal band portion is insertable and which includes a screw portion provided along an inserting direction of the metal band portion and engageable with the plurality of elongated projections. Specifically, by rotating the screw portion of the circumferential length maintaining portion, the plurality of elongated projections engaged with the screw portion are moved and a circumferential length of an annular portion configured by the metal band portion can be adjusted.

Further, even a ring-shaped member made of metal may tighten the large-diameter tubular portion 20 by being swaged and deformed. That is, any member may be used as the fastening member 70 if it is mounted substantially around the large-diameter tubular portion 20 in the circumferential direction and a circumferential length thereof can be adjusted and shortened to tighten the large-diameter tubular portion 20.

Next, an operation of mounting the grommet 10 on the panel 50 is described.

First, the large-diameter tubular portion 20 of the grommet 10 is fitted on the burred part 54 of the panel 50 to set the temporary locked state. At this time, the grommet 10 is so fitted on the burred part 54 that the burred part 54 is located between the inner peripheral surface of the large-diameter tubular portion 20 and the outer peripheral surface of the rib 40. Further, at this time, the grommet 10 is so fitted on the burred part 54 to drive out air in the recess 46 in the form of an annular groove as much as possible. In this way, the air pressure in the closed space enclosed by the second annular protrusion 22, the burred part 54, the coupling portion 16 and the large-diameter tubular portion 20 becomes substantially equal to an ambient air pressure, thereby increasing an effect when a force is applied to pull out the grommet 10.

In this temporary locked state, even if a force is applied to pull out the grommet 10, the grommet 10 is less likely to be displaced by the aforementioned effect of the rib 40 by providing the rib 40.

Subsequently, the ring-shaped fastening member 70 is located around the large-diameter tubular portion 20 and allowed to be gradually resiliently deformed to be contracted. By resiliently deforming the fastening member 70 until an inner diameter of the fastening member 70 becomes smaller than the outer diameter of the large-diameter tubular portion 20, the fastening member 70 bites into the grommet 10, thereby finishing the operation of mounting the grommet 10 on the panel 50.

Note that the fastening member 70 before being deformed and contracted may be located around the large-diameter tubular portion 20 before the large-diameter tubular portion 20 is fitted on the burred part 54, i.e. before the temporary locked state is set. Specifically, the fastening member 70 may be fastened after the large-diameter tubular portion 20 is fitted on the burred part 54.

Further, the wire 60 may be inserted through and fixed to the grommet 10 before or when the temporary locked state is set or after the fastening member 70 is fastened.

Since the grommet 10 according to the embodiment includes the rib 40 projecting from the inner peripheral surface of the coupling portion 16 and configured to cover at least a part of the inner peripheral surface side of the burred part 54 of the panel 50, a displacement of the grommet 10 relative to the burred part 54 can be suppressed after the grommet 10 is mounted on the burred part 54 and in the temporary locked state before a fixing member is mounted on the outer peripheral side of the large-diameter tubular portion 20.

Further, since a projection 44 is further provided which projects from an outward facing surface of the rib 40 to come into contact with the burred part 54 of the panel 50, the grommet 10 is less likely to be displaced relative to the burred part 54.

Further, since the rib 40 is formed around in the circumferential direction, the space enclosed by the burred part 54, the large-diameter tubular portion 20, the coupling portion 16 and the rib 40 is sealed. This causes the sealed space to expand and reduce the air pressure inside when an attempt is made to pull out the grommet 10 from the burred part 54, whereby a pressure acts in a direction opposite to a pulling direction. This makes it difficult to pull out the grommet 10.

Figure 5:
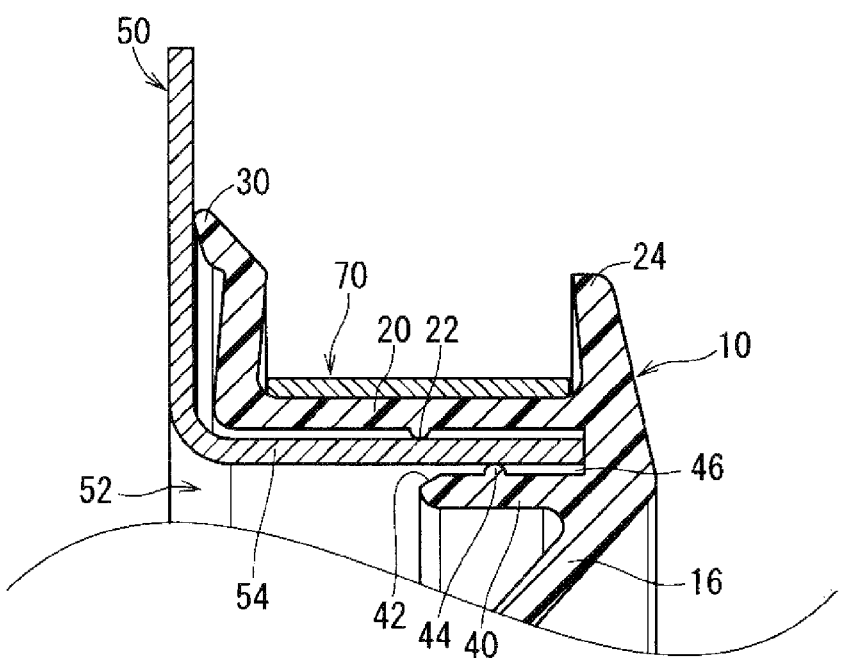
FIG. 5 is a partial enlarged section showing a mounting structure for a grommet according to a modification.

Next, a modification of the grommet 10 according to the embodiment is described. FIG. 5 is a partial enlarged section showing a mounting structure for a grommet 10A according to the modification. Note that constituent elements similar to those of the above embodiment are denoted by the same reference signs and not described in the description of this modification.

The grommet 10A according to the modification differs from the grommet 10 according to the embodiment in further including a projection 44.

Specifically, the projection 44 is formed to project from an outward facing surface of a rib 40 and be held in contact with the burred part 54 of the panel 50.

Here, since the rib 40 is formed around in a circumferential direction, the projection 44 is also formed around in the circumferential direction. This causes a space enclosed by the rib 40, the projection 44, the burred part 54 and a coupling portion 16 to also become a closed space and an effect similar to a flat space enclosed by a large-diameter tubular portion 20, a second annular protrusion 22, the burred part 54 and the coupling portion 16 can be obtained.

Of course, it is not essential to form the projection 44 around in the circumferential direction and a plurality of projections 44 shorter than a circumferential length of the rib 40 may be scattered in the circumferential direction. Also in this case, the projections 44 are held in contact with the burred part 54, thereby increasing a frictional force when the grommet 10A is pulled out. This makes the grommet 10A less likely to be displaced even in a temporary locked state.

Note that the respective components described in the above embodiment and modification can be appropriately combined as long as they are not inconsistent with each other.

Although this invention has been described in detail above, the above description is illustrative in all aspects and this invention is not limited to that. It should be appreciated that unillustrated numerous modifications can be anticipated without departing from the scope of this invention.

LIST OF REFERENCE SIGNS 10, 10A . . . grommet
12 . . . small-diameter tubular portion
14 . . . first annular protrusion
16 . . . coupling portion
20 . . . large-diameter tubular portion
22 . . . second annular protrusion
24 . . . locking portion
30 . . . outer edge sealing portion
40 . . . rib
42 . . . tapered portion
44 . . . projection
46 . . . recess
50 . . . panel
52 . . . through hole
54 . . . burred part
60 . . . wire
70 . . . fastening member

What is claimed is:

1. A grommet to be mounted on a panel with opposite first and second surfaces, a through hole formed through the panel and a tubular burred part projecting from the first surface of the panel around a periphery of the through hole formed in the panel so that the grommet provides sealing between the panel and a wire passed through the through hole, the grommet comprising:
a small-diameter tubular portion having opposite first and second axial ends and an inner peripheral surface extending between the ends, the wire being insertable so that at least part of the inner peripheral surface of the small-diameter tubular portion is held in close contact with an outer peripheral surface of the wire;
a large-diameter tubular portion with opposite first and second axial ends and an inner peripheral surface to be fit on an outer peripheral side of the burred part of the panel with the second end of the large-diameter tubular portion facing the first surface of the panel, the second end of the small-diameter tubular portion being radially inward of the large-diameter tubular portion;

a coupling connecting the second axial end of the small-diameter tubular portion and the first axial end of the large-diameter tubular portion;

a tubular rib projecting from the coupling in a same direction as the large-diameter tubular portion and in a direction parallel to an axial direction of the burred part for a distance less than an axial extent of the large-diameter tubular portion and configured to cover at least a part of an inner peripheral surface of the burred part of the panel;

an annular locking portion projecting radially out from the first end of the large-diameter tubular portion; and an outer edge sealing portion projecting radially out from the second end of the large-diameter tubular portion and being sealingly engageable with the first surface of the panel, wherein no part of the grommet projects through the through hole in the panel and no part of the coupling extends axially beyond the first and second ends of the large-diameter tubular portion.

2. The grommet of claim 1, further comprising a projection projecting from an outward facing surface of the rib to be held in contact with the inner peripheral surface of the burred part of the panel.

3. The grommet of claim 1, wherein the large-diameter tubular portion at least partly overlaps the small-diameter tubular portion in a radial direction.

4. A grommet assembly comprising the grommet of claim 1, and a split fastening ring mounted around an outer peripheral surface of the large-diameter tubular portion.

5. A grommet, comprising:
a small-diameter tubular portion having opposite first and second axial ends;

a large-diameter tubular portion having opposite first and second axial ends, at least the first end of the large-diameter tubular portion being radially outward from the small-diameter tubular portion and the second end of the small diameter tubular portion being radially inward of the large-diameter tubular portion;

a coupling connecting the second end of the small-diameter tubular portion and the first end of the large-diameter tubular portion;

a tubular rib projecting from the coupling at a position opposed to the first end of the large-diameter tubular portion and extending in a same direction as the large-diameter tubular portion and in a direction parallel to an axial direction of the large-diameter tubular portion toward the second end of the large-diameter tubular portion for a distance less than an axial extent of the large-diameter tubular portion;

an annular locking portion projecting radially out from the first end of the large-diameter tubular portion; and an outer edge sealing portion projecting radially out from the second end of the large-diameter tubular portion and being sealingly engageable with the first surface of the panel, wherein no part of the grommet projects through the through hole in the panel and no part of the coupling extends axially beyond the first and second ends of the large-diameter tubular portion.

6. The grommet of claim 5, further comprising an annular projection projecting from an outer circumferential surface of the tubular rib.

* * * * *